(12) United States Patent
Starflinger

(10) Patent No.: US 9,883,768 B2
(45) Date of Patent: Feb. 6, 2018

(54) ELECTRICALLY OPERATED KITCHEN APPLIANCE

(71) Applicant: Vorwerk & Co. Interholding GmbH, Wuppertal (DE)

(72) Inventor: Frank Starflinger, Bochum (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 361 days.

(21) Appl. No.: 14/438,302

(22) PCT Filed: Oct. 18, 2013

(86) PCT No.: PCT/EP2013/071815
§ 371 (c)(1),
(2) Date: Apr. 24, 2015

(87) PCT Pub. No.: WO2014/064001
PCT Pub. Date: May 1, 2014

(65) Prior Publication Data
US 2015/0257589 A1    Sep. 17, 2015

(30) Foreign Application Priority Data
Oct. 26, 2012   (DE) .................. 10 2012 110 239

(51) Int. Cl.
*A47J 36/10*   (2006.01)
*A47J 43/046*  (2006.01)
(Continued)

(52) U.S. Cl.
CPC ............. *A47J 36/10* (2013.01); *A47J 43/046* (2013.01); *A47J 43/0727* (2013.01); *B65D 45/00* (2013.01)

(58) Field of Classification Search
CPC ........ A47J 27/004; A47J 36/10; A47J 43/046; A47J 43/0727; B65D 45/00
(Continued)

(56) References Cited

U.S. PATENT DOCUMENTS 4,863,278 A * 9/1989 Otto ...................... A47J 43/046
241/282.2
4,883,189 A * 11/1989 Lobbert ................... A61L 11/00
220/211
(Continued)

FOREIGN PATENT DOCUMENTS

DE           10210442 A1    9/2003
DE      10 2011 051149 A1   4/2012

OTHER PUBLICATIONS

International Search Report of PCT/EP2013/071815, dated Jan. 16, 2014.

*Primary Examiner* — Reginald L Alexander
(74) *Attorney, Agent, or Firm* — Collard & Roe, P.C.

(57) ABSTRACT

An electrically operated kitchen appliance with a cooking vessel and a lid for the cooking vessel, wherein: the lid can be locked in the closed position against the cooking vessel; the cooking vessel has a cooking vessel base and a cooking vessel wall extending upwards from the base; the cooking vessel wall transitions into a radially projecting cooking vessel edge; the lid has a lid edge, which covers the cooking vessel edge in the closed position; and the lock is formed by a locking part acting on the lid. In order to further improve a kitchen appliance of the type mentioned, particularly with respect to handling the lid of the cooking vessel, according to the invention a hinged section, which can be operated by an electric motor, is provided to interact with the lid edge, such that the lid can be pivoted by the motor out of a closed (Continued)

position into an open position and the lid can be removed from the hinged section by the user non-destructively.

20 Claims, 12 Drawing Sheets

(51) Int. Cl.
*B65D 45/00* (2006.01)
*A47J 43/07* (2006.01)

(58) Field of Classification Search
USPC ............ 99/510, 511, 512, 513, 403, 348;
220/315, 211, 810, 820; 241/285.1, 37.5;
292/194, 198
See application file for complete search history.

(56) References Cited

U.S. PATENT DOCUMENTS

| | | | | |
|---|---|---|---|---|
| 5,809,872 | A * | 9/1998 | Sundquist | A47J 43/046 |
| | | | | 241/37.5 |
| 6,640,698 | B2 * | 11/2003 | Pavlovic | A47J 43/087 |
| | | | | 241/37.5 |
| 8,456,120 | B2 * | 6/2013 | Wang | B65F 1/06 |
| | | | | 220/211 |
| 2013/0206771 | A1 | 8/2013 | Arnold et al. | |

\* cited by examiner

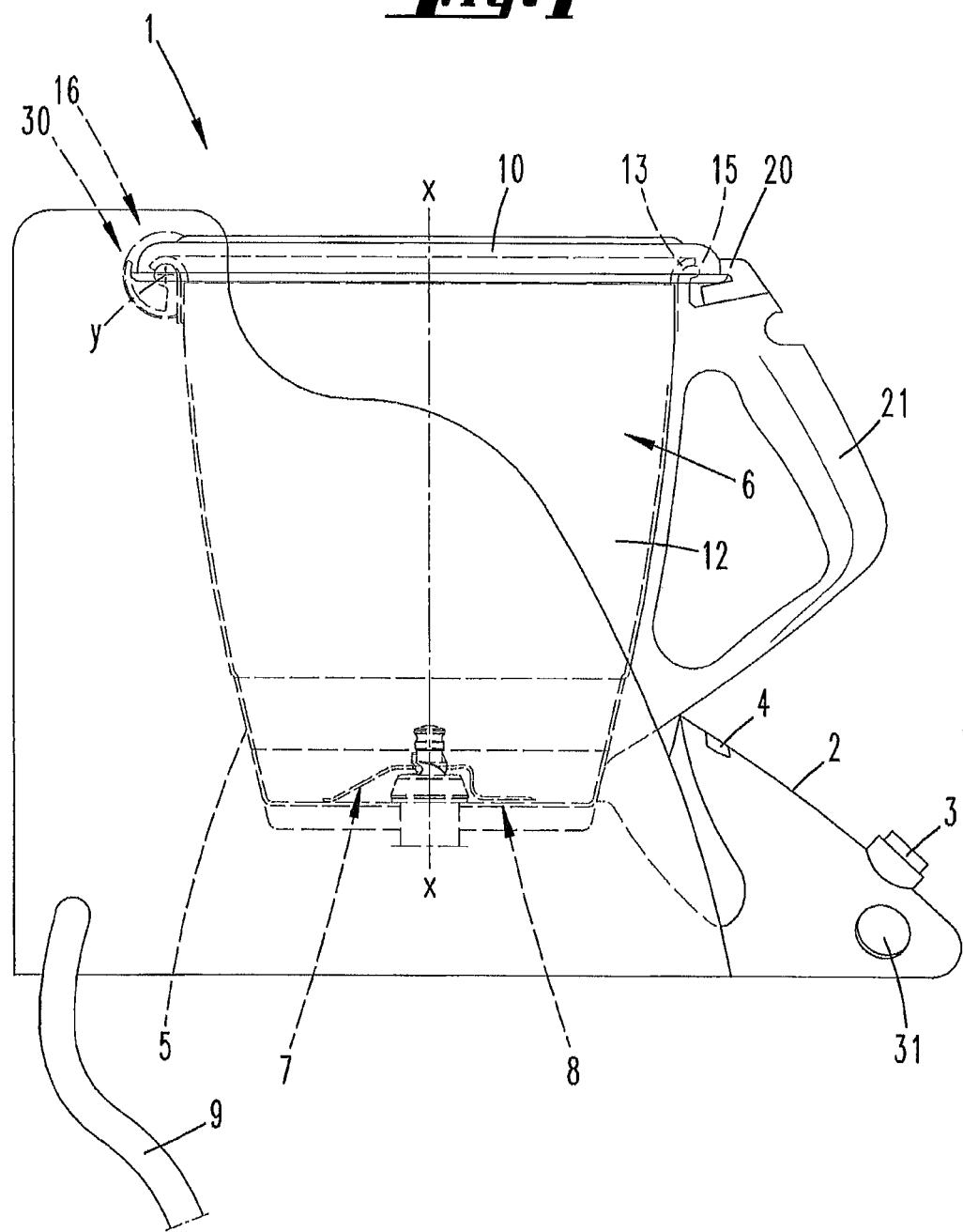

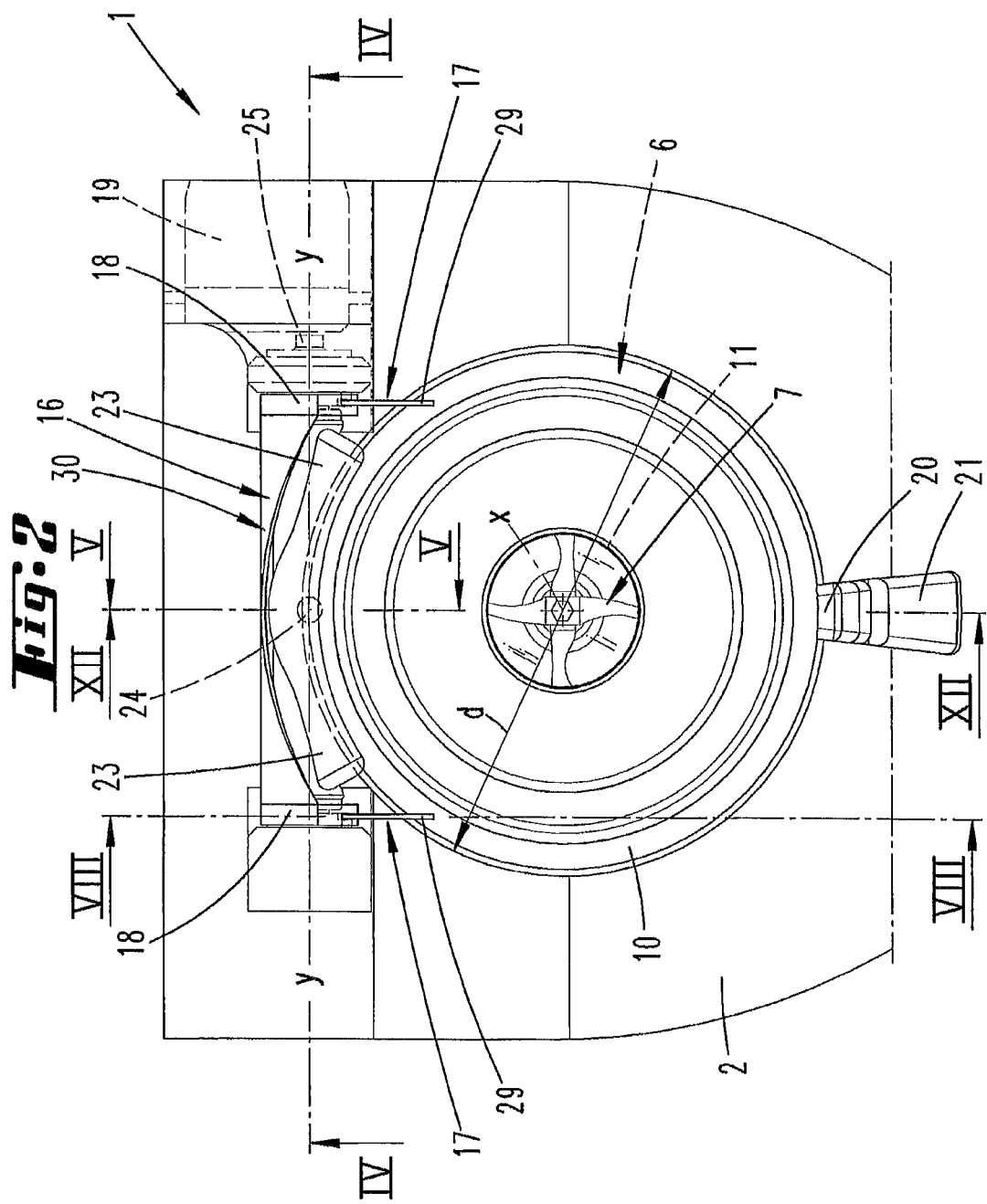

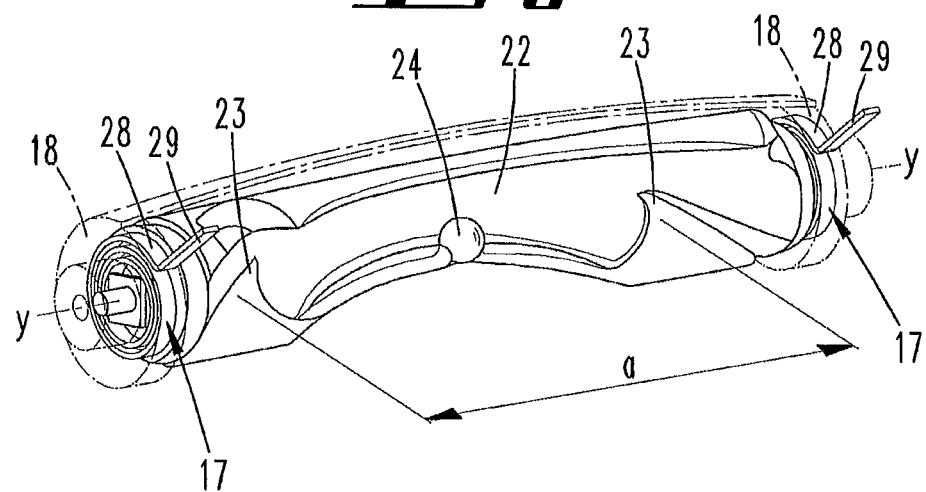
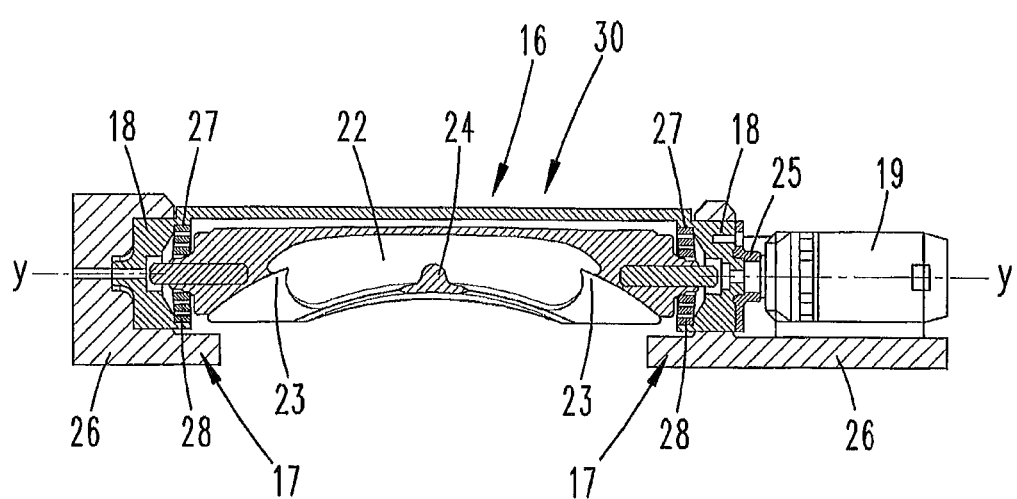

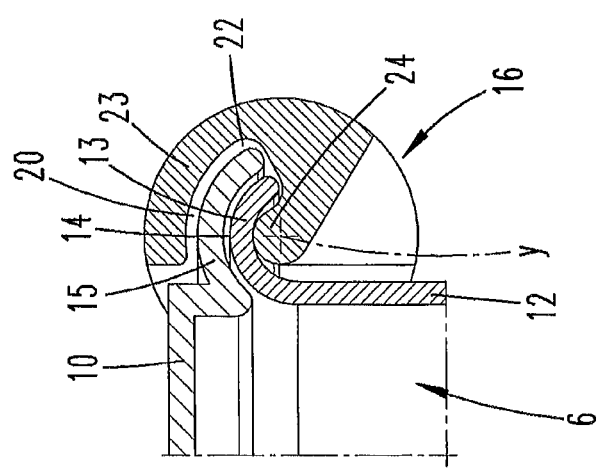
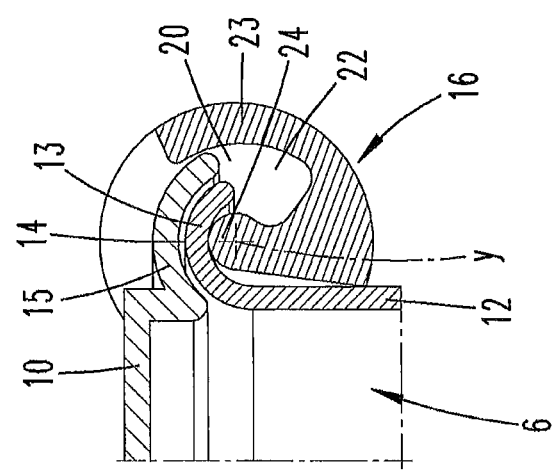
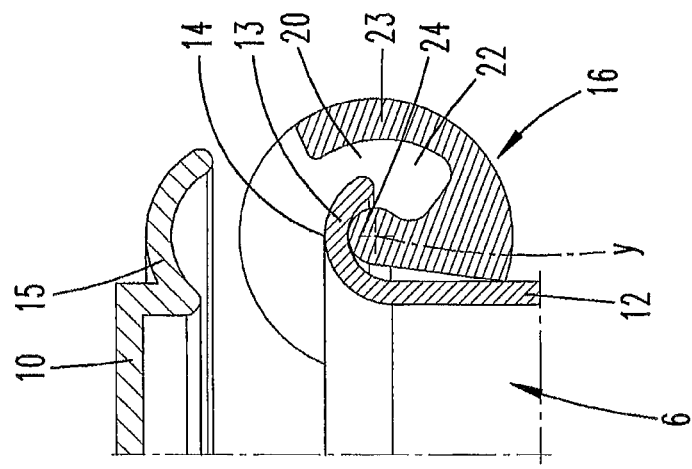

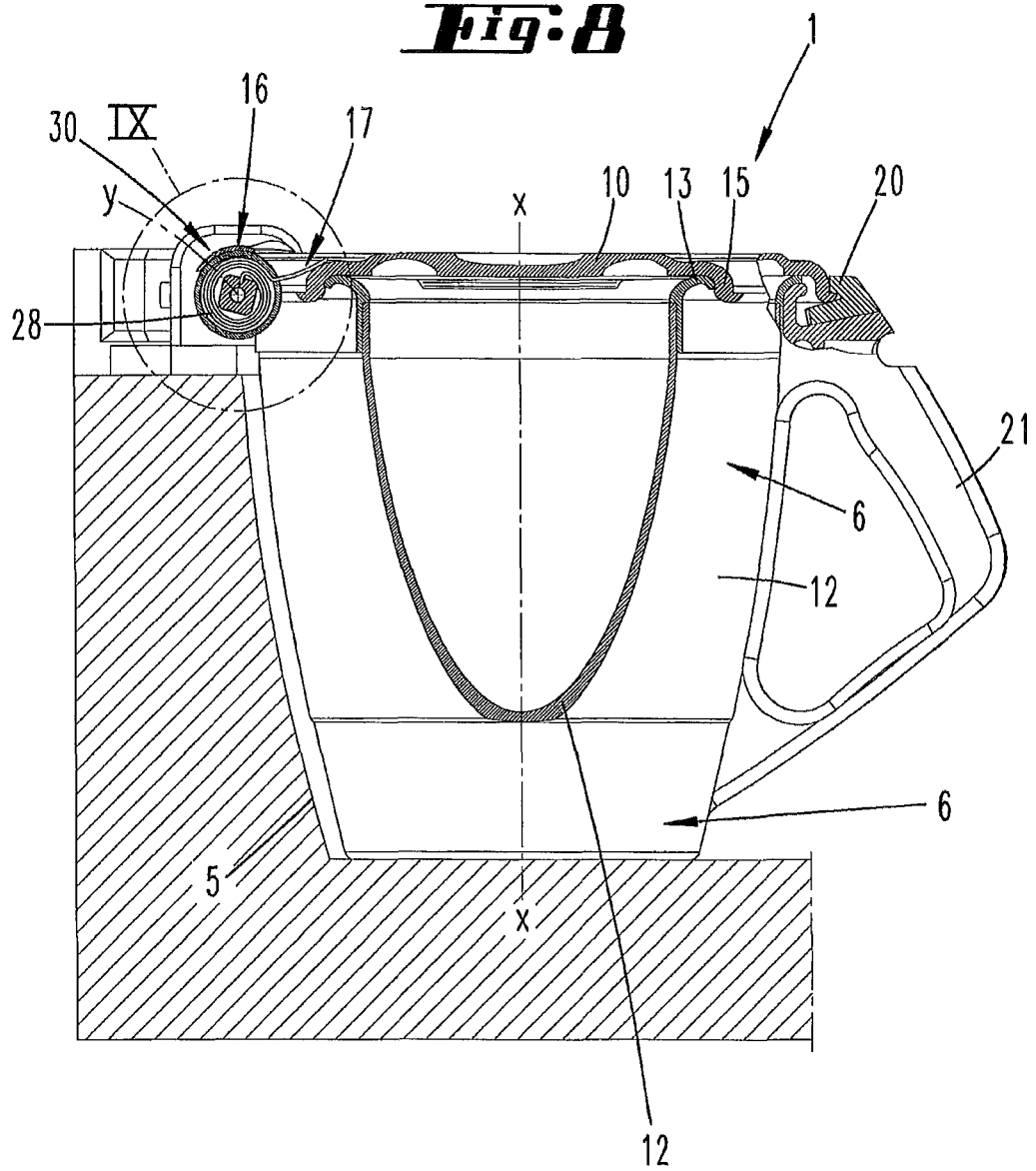

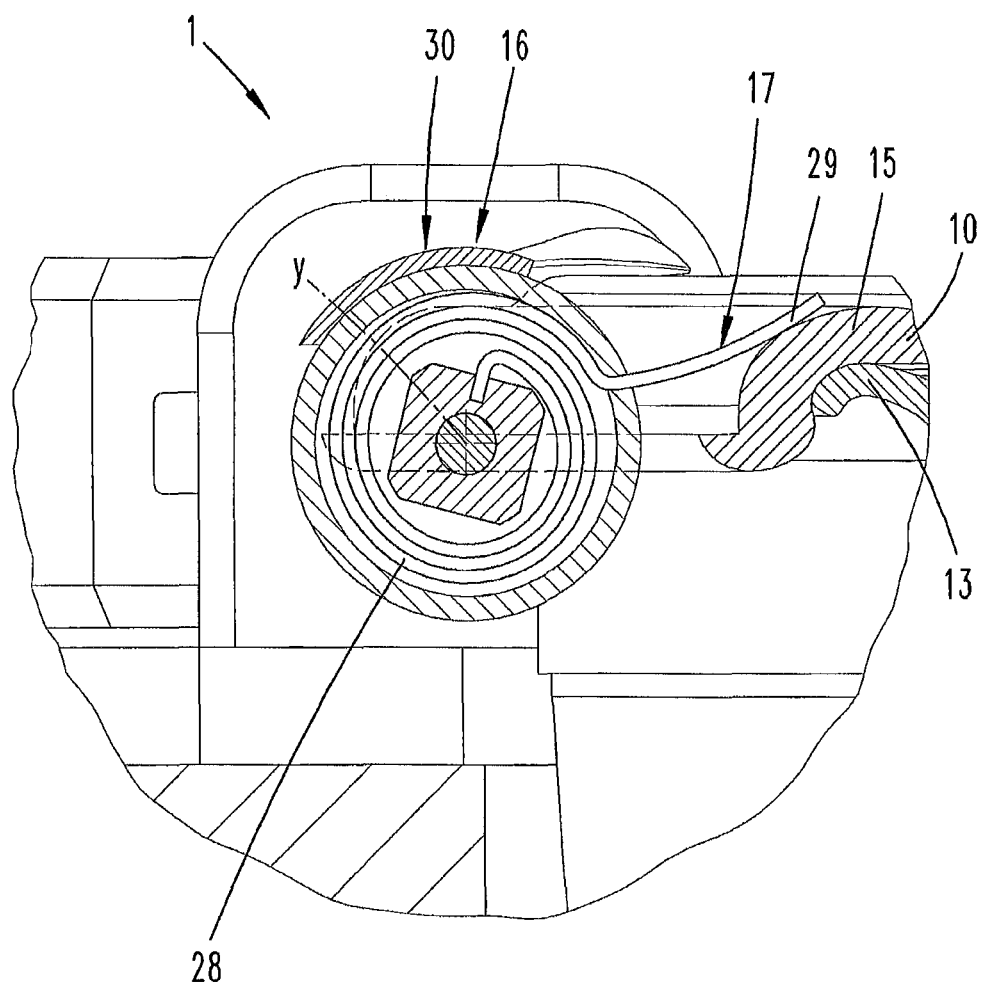

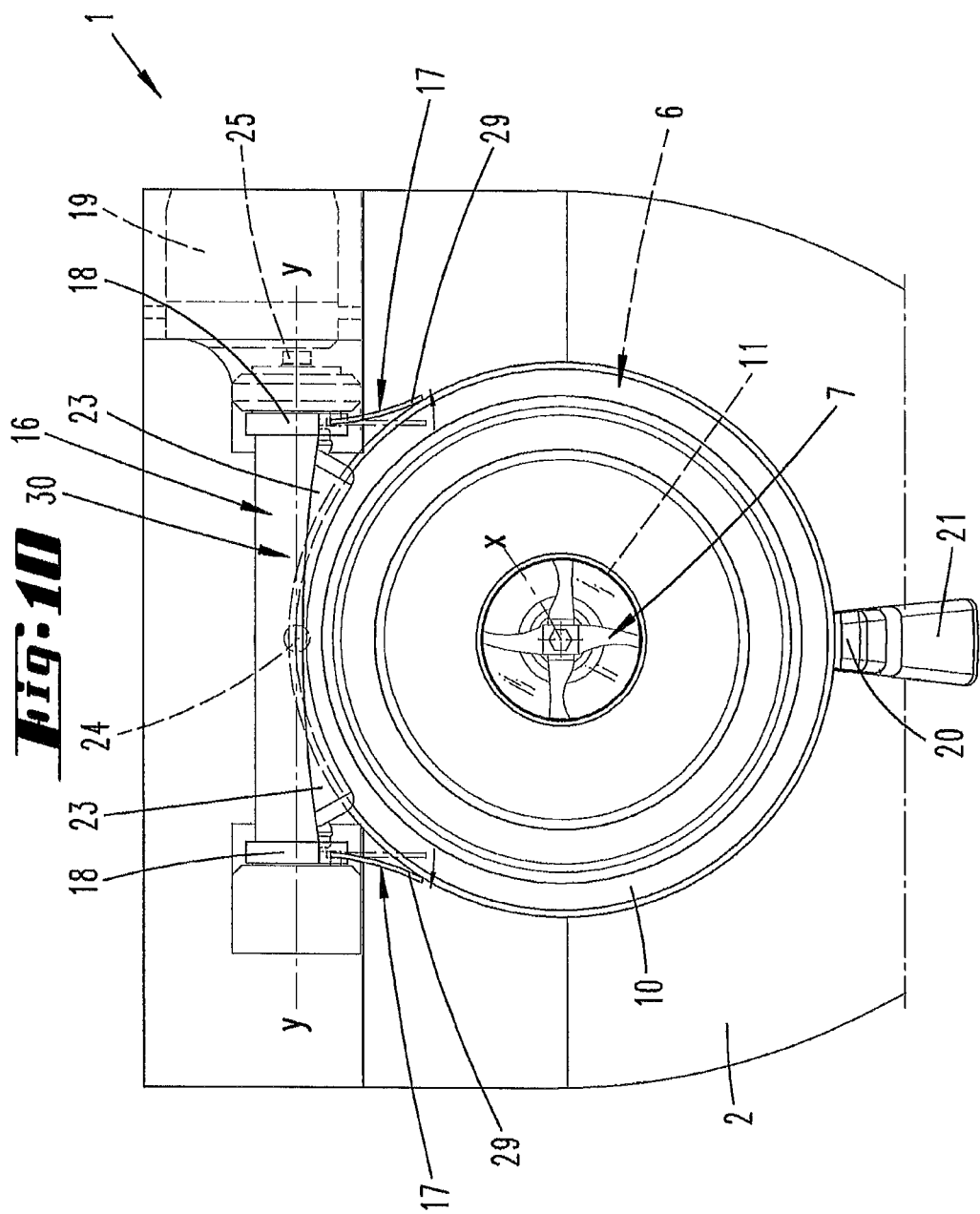

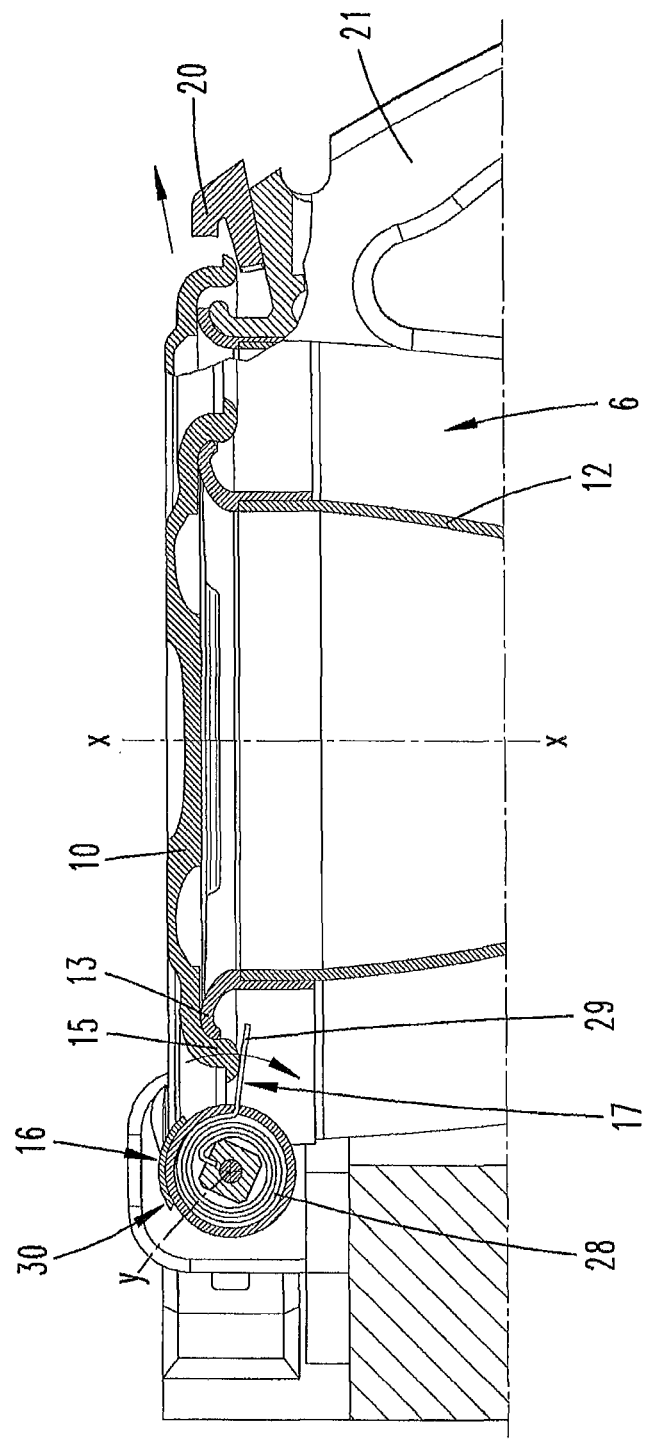

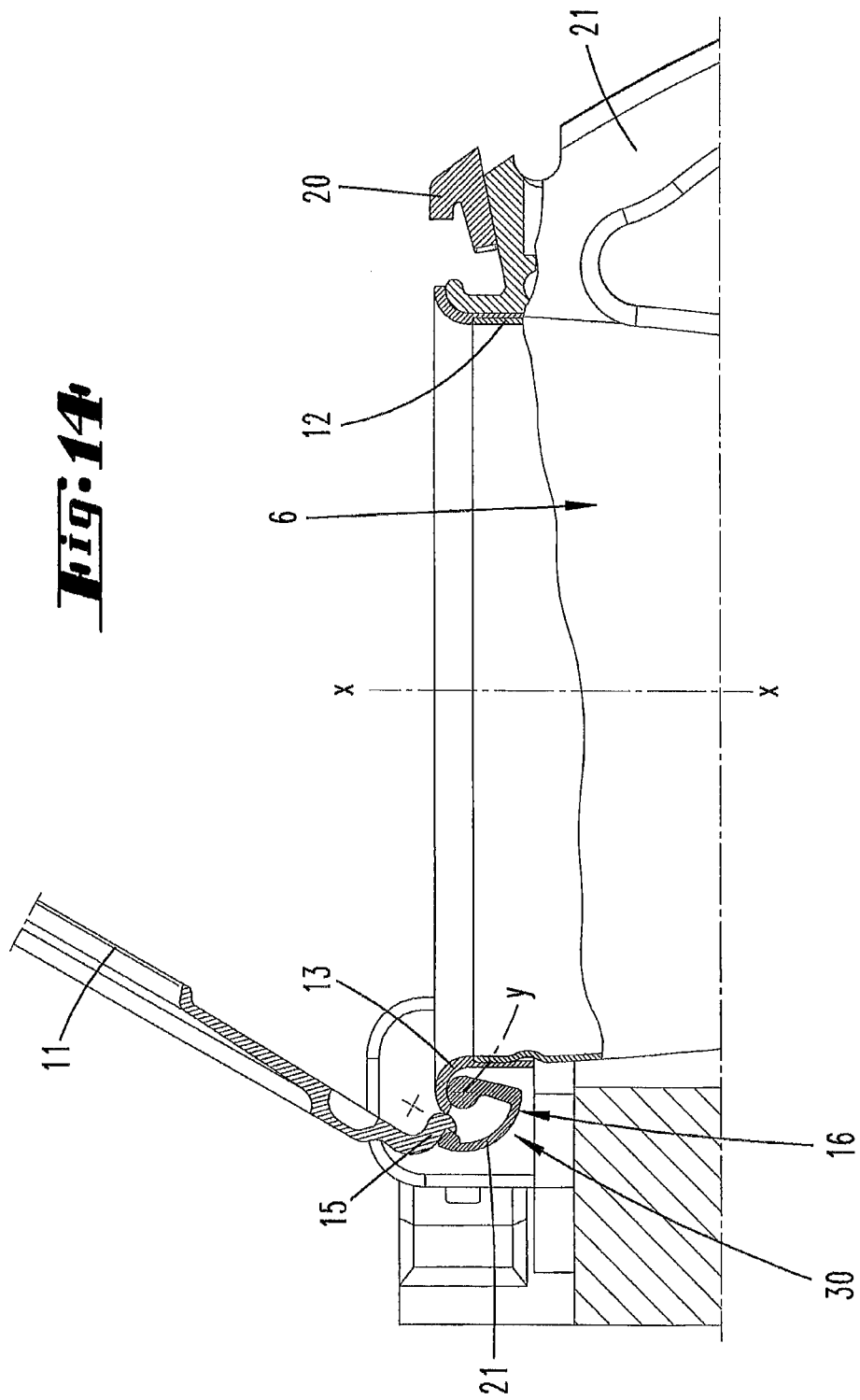

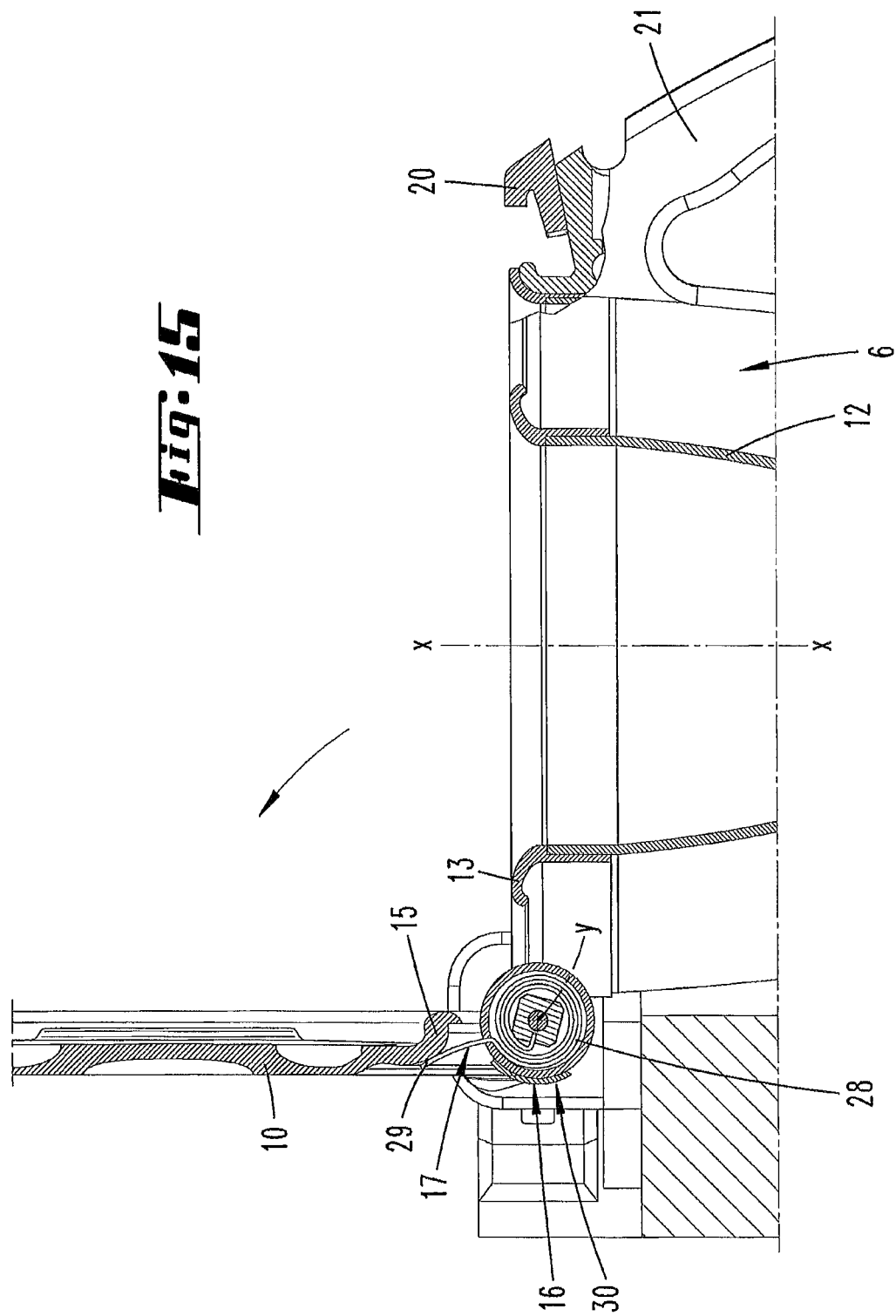

ELECTRICALLY OPERATED KITCHEN APPLIANCE

CROSS REFERENCE TO RELATED APPLICATIONS

This application is the National Stage of PCT/EP2013/071815 filed on Oct. 18, 2013, which claims priority under 35 U.S.C. § 119 of German Application No. 10 2012 110 239.2 filed on Oct. 26, 2012, the disclosure of which is incorporated by reference. The international application under PCT article 21(2) was not published in English.

The invention relates to an electrically operated kitchen appliance with a cooking vessel and a lid for the cooking vessel, wherein the lid can be locked in the closed position against the cooking vessel, wherein the cooking vessel furthermore has a cooking vessel base and a cooking vessel wall extending upwards from the base, wherein the cooking vessel wall transitions into a radially projecting cooking vessel edge, wherein the lid furthermore has a lid edge, which covers the cooking vessel edge in the closed position, wherein the lock is furthermore formed by a locking part acting on the lid.

Kitchen appliances of the type in question are known. In particular in the household sector, they serve to make or prepare dishes, for the purpose of which the cooking vessel, which can be assigned to the kitchen appliance, is designed to accommodate food, for example food to be cooked or fluids. In particular in the case of heatable cooking vessels for kitchen appliances, high pressures are to some extent reached within the vessel, in particular in the course of the cooking process. If a mixer is also assigned to the cooking vessel in particular in the base area, a liquid column might possible act on the base side against the lid, which is attached to the cooking vessel during mixing operation. Said lid must be locked accordingly to the cooking vessel, with said lock being able to accommodate the pressures, which might be created in the cooking vessel, or the forces, which act on the lid, respectively. Solutions, in the case of which the lid can be fixed to the cooking vessel, for example via a bayonet-like twistlock, are known in this context.

A kitchen appliance of the type in question is furthermore known from DE 10210442, for example. A further locking possibility using a hinged section, which acts on the lid, is known from DE 102011051149 A1, for example. Preferably, this is a roller arrangement, which can be rotated about a hinged section longitudinal axis, with said roller-like locking part reaches in particular over the lid edge to secure the same vertically on the top in the lid locked position. The entire content of the afore-mentioned patent applications is hereby included in the disclosure of the instant invention, also for the purpose of including features of these patent applications into claims of the instant invention.

With regard to the above-described state of the art, a technical problem of the invention is seen in further improving a kitchen appliance of the type in question, in particular with regard to the lid handling of the mixing vessel.

According to a first idea of the invention, a possible solution of the task is at hand in the case of a kitchen appliance, which focuses on provision being made for a hinged section, which interacts with the lid edge and which can be operated by an electric motor, for pivoting the lid from a closed position into an open position by means of a motor and for the lid to be capable of being removed from the hinged section by the user non-destructively. As a result of this embodiment, a kitchen appliance having an increased serviceability is specified. In particular the handling of the lid, which spans the cooking vessel during operation, is substantially simplified. A hinged section, which is assigned to the kitchen appliance, for displacing the lid from a closed position into an open position by pivoting and preferably beyond that also from an open position into the closed position, provides the user with the possibility of exposing the interior of the cooking vessel, without hereby grabbing the lid itself. The lid is pivoted in particular from the closed position into an at least largely releasing open position, which releases the interior of the vessel, via the hinged section, this furthermore in particular about a pivot axis, which runs at right angles to the central cooking vessel axis. The controlling of the hinged section, which preferably takes place by means of electric motor, provides for an advantageous handling. A corresponding pivoting of the lid from the one position into the other position can thus preferably be reached by pushing a button, wherein intermediate positions between the closed position and the open position of the lid can also be assumed in a further preferred embodiment. The lid can be removed from the hinged section by the user without tools, further in particular non-destructively in particular in the open position, so as to be able to clean the lid in a very simple manner, for example. If applicable, a common kitchen tool, in particular a tool, which can be used in the context with the kitchen appliance, such as, for example a spatula or the like, which supports the turning over of food to be cooked in the cooking vessel, serves to remove the lid from the hinged section. In preferred embodiment in the assigned position, the lid edge, which is preferably circumferential as a whole, continues to the hinged section so as to cover the hinged section, this in its given geometric outline in the form of an arch. In a preferred embodiment, an undirected assignment of the lid to the hinged section can thus be attained, in particular in the case of a completely circular outline of the lid, in particular of the lid edge. Due to the interaction of hinged section and lid in the area of the lid edge, the lid surface, in particular the central lid area, remains substantially uninfluenced by the hinged section acting on the lid in the preferred embodiment.

Further features of the invention are explained below, also in the description of the figures Provision is thus made in a further preferred embodiment for the hinged section to act on the lid edge by means of a positive locking or frictional connection for holding the lid, wherein the hinged section can remain at the kitchen appliance after removing the lid. Accordingly, the lid is preferably held on the hinged section so as to be capable of being detached, preferably via the embodiment of a positive locking or frictional connection. In a preferred embodiment, the hinged section itself is part of the kitchen appliance, accordingly remains at the latter even if the lid is removed. In the alternative, the hinged section or at least a partial section of the hinged section can be removed individually or also together with the lid.

The frictional connection is preferably reached by means of a detent or a magnetic adhesion, wherein, in the case of a detent, provision is more preferably made in the hinged section for a detent part, which can escape against spring force and which interacts with a detent recess in the area of the lid edge. The part, which escapes against spring force, can hereby be a separate part. In the alternative, this part is formed by the spring itself, in particular a spring arm.

The hinged section encompasses a pivot axis, wherein the hinged section is more preferably embodied so as to be elongated in the direction of extension of the pivot axis, thus further in particular so as to be cylindrically elongated.

In a further preferred embodiment, the hinged section, which displaces the lid from the closed position into the open position, is simultaneously the locking part of the lid at the cooking vessel or at the kitchen appliance, respectively, in the cooking vessel closed position.

Provision is made in a further preferred embodiment for the geometric axis of the hinged section in its extension to be adapted to a plane, which is spanned by a lid edge. Preferably, the hinged section extends at least partially in a plane, which accommodates the lid edge and/or the vessel edge circumferentially, said plane being oriented at right angles to a vertically oriented vessel axis in preferred embodiment. More preferably, the geometric axis runs horizontally here or at an incline to a horizontal axis, more preferably assuming an acute angle of between 1° and 15° or up to 30°, more preferably running parallel to the plane with a tolerance of preferably between ±0.5° and 30°.

Provision is preferably also made for the geometric axis to be arranged outside of the vessel wall. This geometric axis extends in particular at a radial distance to an outer surface of the vessel wall, more preferably at a radial distance outside of the vessel wall section, which is assigned to the geometric axis by height, so that, in a possible embodiment, preferably at a vertical distance, above and/or below the geometric axis in a vertical projection—with reference to a use position of the vessel—the geometric axis does indeed affect an area of the vessel wall or also permeates it. Provision is more preferably also made for the geometric axis to permeate the vessel wall in the area of the vessel wall section, which is assigned to the axis by height, more preferably such that the geometric axis, viewed across its extension, extends with a partial section through the interior of the vessel, wherein, more preferably, at least a further partial section of the geometric axis extends in corresponding extension by permeating the vessel wall outside the latter.

In a further preferred embodiment, provision is made for a positive locking to be reached in the locked position, wherein at least a partial section of the hinged section overlaps the lid, in particular the lid edge in the manner of a positive locking. In the initial position of the lid, which is not stressed during the operation of the kitchen appliance by means of pressure application or the like from the inside, the section of the hinged section, which interacts with the lid edge, preferably does not act as a frictional connection, even though, in an alternative embodiment, such a frictional connection can be attained in addition to the positive locking as a function of the embodiment of the seal acting between lid and vessel wall or vessel edge, respectively, if applicable. To form the positive locking, in particular the section of the hinged section, which serves to lock, is adapted in form to the lid edge, which is to be overlapped, with regard to a vertical cross section at least in sections.

Provision is preferably also made for the hinged section to be rotatably drivable from the released position into the locked position and vice versa from one or both end areas. Directly acting upon the hinged section, but possibly also acting on a section, which extends the hinged section, for example a drive shaft, which is connected to the hinged section in a form-locking manner, the hinged section can be seized by the user by hand so as to displace it or, as an alternative or combination thereto, it can be driven by means of an electric motor, which is assigned, more preferably provided accordingly in the kitchen appliance. In the event of a rotary drive via an electric motor on the kitchen appliance side, the displacement of the hinged section into the locked position or from the locked position into the released position preferably takes place by pushing a button or the like, more preferably automatically by turning on the kitchen appliance or start-up, respectively, of a heater of the kitchen appliance and/or of a mixer of the kitchen appliance. If provision is furthermore, and preferably, made for a lid detection, a start-up of the kitchen appliance (heater and/or mixer) is possible only if the lid is attached and locked properly. In addition, the geometric axis preferably extends below the vessel edge, more preferably at a vertical distance to an opening plane of the vessel, with said distance preferably corresponding to one-twentieth to one-fifth of the largest diameter in the area of the vessel edge.

The hinged section encompass an overlap section, which, in the locked section, is guided across the lid edge to secure the latter. In this context, it is preferred for at least two overlap sections to set in at the hinged section in circumferential direction of the lid edge at a distance from one another in the locked state. In the locked position, a securing overlapping of the lid or of the lid edge, respectively, at two points, which are spaced apart from one another in circumferential direction, is thus attained. Preferably, each overlap section overlaps the lid edge with a vertical play in the range of a tenth of a millimeter, more preferably with a vertical play of between 0.1 and 1 mm, wherein the play is further chosen such that a vertical movability of the lid is permitted during the operation of the kitchen appliance, without hereby impacting the tightness, which is ensured by means of the preferred radial seal. Due to the vertical play between overlap section and lid edge, which is preferably provided, the overlap section overlaps freely without frictionally engaged or force-locking interaction with the lid edge in the course of the locking displacement of the hinged section as well as in the locked position.

In the locked state, the outermost locking areas of the hinged section are more preferably spaced apart from one another by $\frac{1}{10}$ to $\frac{1}{2}$ of the lid diameter, more preferably by $\frac{1}{8}$ to $\frac{1}{3}$, more preferably by $\frac{1}{4}$ of the lid diameter or of the mean extension rate of the lid, viewed at right angles to the vertical axis of the cooking vessel.

It is also preferred for the hinged section to cover the lid edge with a circular arc-like cross section across an area of between 30 and 90° and/or to move towards it, wherein, more preferably, in particular one overlap section is oriented concentrically to the axis of rotation of the hinged section. More preferably, the vessel edge and/or the lid edge also extend at least approximately concentrically to the axis of rotation of the hinged section in a vertical section, more preferably in the assigned position of the vessel and lid, wherein, in particular in response to a corresponding vertical cross section embodiment of the lid edge as a result of the preferably concentric orientation of lid edge and overlap section, the latter more preferably overlaps the lid edge across the entire displacement path at a vertical distance of a few tenth of a millimeter.

More preferably, the locked position as well as the released position of the hinged section are stop-limited, in particular as a result of the design measures at the hinged section and/or at the partners, which interact with the hinged section, such as cooking vessel and/or lid. In the case of a drive by means of an electric motor, the rotational limitation of the hinged section can further also in particular be formed as a result of the embodiment of the electric motor as actuator, with said actuator allowing only for a rotation-limited displacement of the hinged section. If the stop in the locked position is embodied at the lid, it can simultaneously also serve as detecting means. If a displacement of the hinged section beyond the stop position, in particular by means of an electric motor, is possible, the stop is missing and thus the lid, with the locking path, which is too long, being detected by means of a corresponding sensor system.

In one embodiment, two hinged sections are arranged opposite one another relative to a center axis of the cooking vessel, wherein, as a whole, an at least four-point locking of the lid to the cooking vessel is attained. The axes of the two hinged sections hereby preferably run parallel to one another.

In a further alternative, provision is made for two hinged sections located opposite one another, wherein the axes of the hinged sections draw an acute angle relating to a top view onto the cooking vessel or onto the lid, respectively, thus in particular an acute angle of between 30 and 60°, more preferably approximately 45°. Provision is hereby made for at least four sections, which overlap the lid edge, distributed across the circumference, wherein, in a more preferred embodiment relating to a top view, provision is made opposite an intersection point of the two locking axes for a stationary overlap, from which a preferred 5-point lock of the lid follows accordingly.

It is further preferred for the cooking vessel to be held in vertical direction by means of the hinged section, so as to be able to compensate the required length tolerances between cooking vessel and the housing of the kitchen appliance, which accommodates the cooking vessel, on the underside of the vessel in a specific manner. Provision is made for this purpose for the hinged section to encompass one or a plurality of contact areas for the vessel edge, so that, in a preferred embodiment, the cooking vessel hangs at the hinged section, more preferably at the hinged sections, so as to hang, as it were, this more preferably in the case of a corresponding circumferential setting of the cooking vessel in particular in the lower area, which faces the base of the vessel. Preferably, the contact area is embodied in a spherical head-shaped or convex manner. Relating to a vertical cross section, it is furthermore in particular embodied for supporting the correspondingly form-adapted vessel edge in a positive manner. Relating to the longitudinal extension of the hinged section, this contact area is preferably embodied in the center between the outermost locking areas, so that, after a displacement of the hinged section into the locked position, the overlap sections overlap the lid edge accordingly, viewed in circumferential direction of the lid, spaced apart evenly thereto on both sides of the contact area.

In a further embodiment, the hinged section preferably encompasses two contact areas for the vessel edge, offset across the circumference of the vessel edge, this more preferably in context with a geometric axis, which permeates the vessel wall. More preferably viewed in the direction of extension of the axis, these preferred two contact areas are embodied upstream of and downstream from the permeation locations of the geometric axis through the vessel wall, this more preferably in a point-type manner, furthermore, as is also preferred in the case of only one contact area, in a linear manner. In particular a cleaning of a hinged section, which is embodied in this manner, is further improved through this.

In addition, a total of at least a four-point contact is attained by means of the preferred arrangement of two contact areas, more preferably in the case of the arrangement of two hinged sections, whereby a sufficient stability is attained in a preferred embodiment.

Provision is made in a further preferred embodiment for the pivot effect on the lid to occur via an acting part, which is provided in the hinged section and which optionally acts on the lid edge. Preferably, the acting part is adjusted such or can be adjusted such, respectively, that it optionally acts on the lid edge for entraining the lid in the course of the pivoting or releases the lid edge to remove the lid from the hinged section. Provision can hereby be made on the hinged section for only one acting part. Preferably, a plurality, more preferably two acting parts, are assigned to a hinged section, in a preferred embodiment at a distance to one another in the direction of extension of the pivot axis of the hinged section.

Preferably, the acting part is embodied so as to be resilient in pivot direction-direction of rotation of the hinged section, wherein the spring force is more preferably adjusted such that a secure pivot-rotation entrainment of the lid can be attained via the acting part. In a preferred embodiment, the acting part as a whole is thus a spring, more preferably a coil spring, wherein, in the latter case, the coil spring acts on the assigned section of the lid edge via a free spring leg to pivot-entrain the lid.

In preferred embodiment, the acting part, which is embodied so as to be resilient, further in particular a spring arm of an acting part, which is embodied in a resilient manner, can be moved between an acting position, which reaches under the lid, and a lid release position by operating in particular the hinged section by means of an electric motor. In the acting position, the lid is clamped in the area of its lid edge between the acting part or between the acting parts, respectively, and sections of the hinged section, which are stationary relative to the acting parts. In interaction with the hinged section, the acting part or acting parts act on the lid edge in a pinching manner, so to speak. Due to further displacement in particular of the hinged section by means of an electric motor, more preferably beyond a predefined lid open position, the acting part is moved into a lid release position, in which the pinching effect on the lid edge is eliminated. After this, the user can remove the lid from the hinged section in a very simple manner.

More preferably, the movement between the acting position and the release position is hereby attained when the acting part moves across the lid edge so as to overlap it. For this purpose, the acting part is preferably acted upon by means of an electric motor in such a manner that, in a preferably stop-limited final pivoting position of the lid and of the hinged section acting thereon, the further rotational impact on the acting part has the result that in particular the section of the acting part, which acts on the lid edge, slips, so that in particular this section loses the position, which reaches under the lid edge and, as is more preferable, assumes a position, which at least partially overlaps the lid edge. The clamping effect in the area of the lid edge is eliminated through this. Due to opposite effect of rotation on the acting part, the clamping acting position can be reached by corresponding overlapping overtraveling towards the lid edge underside, if the lid is inserted into the hinged section again.

As a result of one or also of a plurality of the above-described features, an automatic lid lifting mechanism is created, which, if required, lifts the lid, so as to facilitate the refilling of large-volume ingredients into the cooking vessel, for example. When closing the lid, the lid positioning and thus also the sealing positioning is preferably assumed automatically. During the cooking operation, the direct contact of the user with the lid, which might be hot, is reduced to a minimum, wherein the lid preferably remains at the appliance during the entire food preparation. The lid needs to be removed from the appliance only for intermediate and/or final cleaning. In a preferred embodiment, food residues adhering to the lid can drip back into the cooking vessel in the open state of the lid. As a result of pivoting the lid into an open position, the cooking vessel can also be removed from the appliance and can be assigned to it again at any time. Because it remains on the appliance, the lid does not require any additional storage space; it furthermore does not create any additional contaminations on a storage space. At the same time, the proposed embodiment and impact of the acting part preferably forms an overload protection, thus preferably protects the upright lid against being damaged in response to external influences by overlapping.

The invention will be explained below by means of the enclosed drawing, which, however, only represents an exemplary embodiment. On the drawing, FIG. 1 shows a kitchen appliance of the type in question in side view comprising a lid-closed cooking vessel;

FIG. 2 shows the top view of FIG. 1;

FIG. 3 shows a locking part or hinged section, respectively, for fixing and for pivoting open the lid in perspective illustration;

FIG. 4 shows the longitudinal section through the locking part or hinged section, respectively, according to line IV-IV in FIG. 2;

FIG. 5 shows the section according to line V-V in FIG. 2, relating to a lid locked position;

FIG. 6 shows an illustration, which corresponds to FIG. 5, relating to the lid unlocked position;

FIG. 7 shows an illustration, which corresponds to FIG. 6, when the lid is removed;

FIG. 8 shows the section according to line IV-IV in FIG. 2, relating to the lid locked position;

FIG. 9 shows the enlargement of the area IX in FIG. 8;

FIG. 10 shows the top view according to FIG. 2, an intermediate position in the course of the pivot displacement of the hinged section into a position, which clamps the lid in the area of the lid edge;

FIG. 11 shows an enlarged sectional illustration according to FIG. 8, relating to the lid clamped position by means of the hinged section;

FIG. 14 shows a sectional illustration, which corresponds to FIG. 12, relating to the lid position according to FIG. 13;

FIG. 15 shows the sectional illustration according to FIG. 13, relating to the lid open position, furthermore a lid released position.

Figure 12:
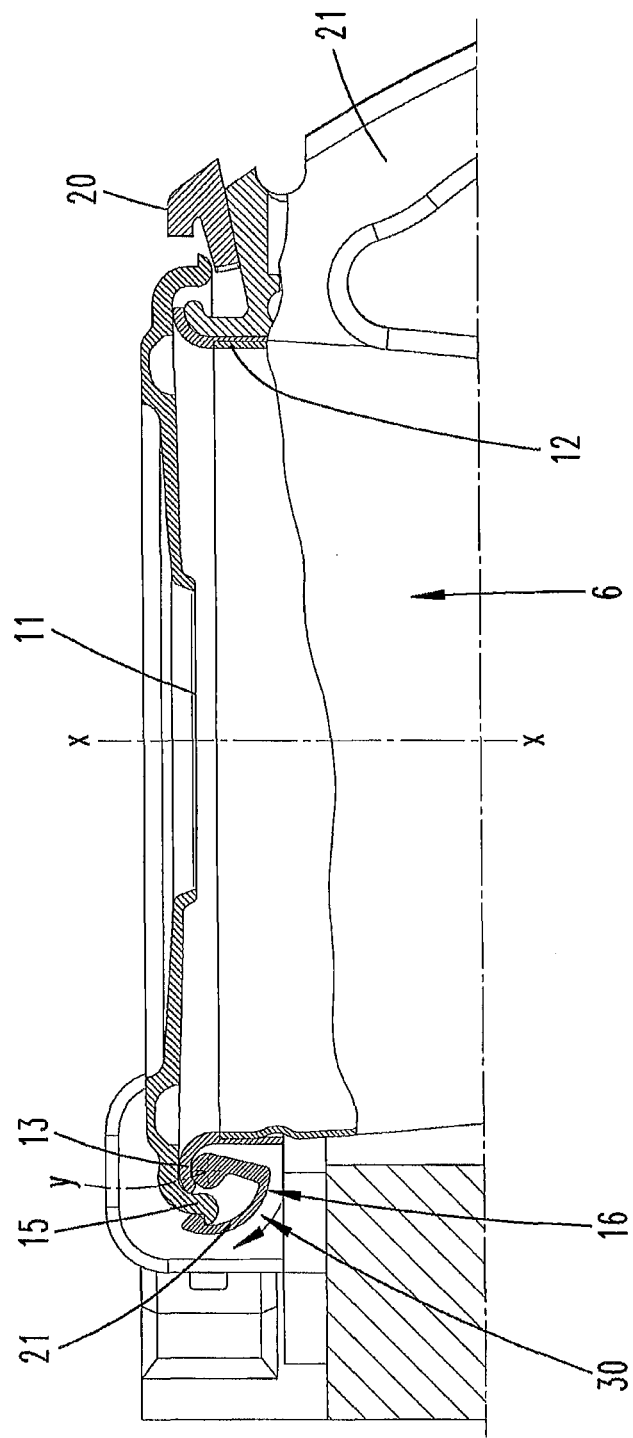
FIG. 12 shows the section according to line XII-XII in FIG. 2, relating to the position according to FIG. 11.
Figure 13:
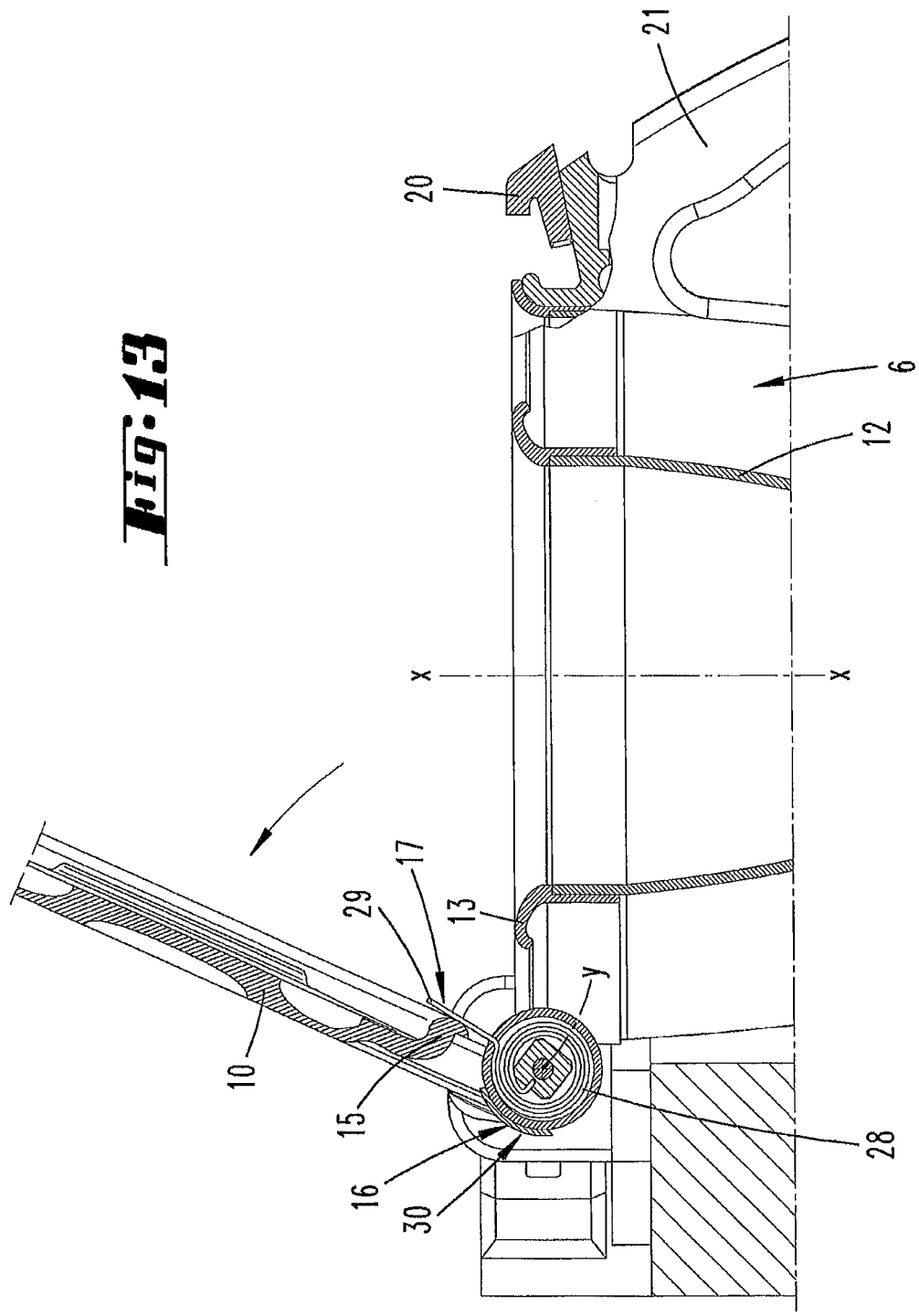
FIG. 13 shows a sectional illustration, which corresponds to FIG. 11, but relating to an intermediate position in the course of pivoting open the lid by means of the hinged section.

With reference to FIG. 1, what is illustrated and described initially is an electrically operated kitchen appliance 1.

Said kitchen appliance initially encompasses a control panel 2 preferably comprising a plurality of controllers and/or buttons 3 as well as preferably a display 4 for displaying the parameters, which are to be adjusted in particular via the controllers and/or buttons 3.

The kitchen appliance 1 furthermore has a vessel accommodation 5.

A cooking vessel 6 can be accommodated and held in said vessel accommodation in particular in the base area thereof, preferably in a positive manner.

Preferably, the vessel 6 is embodied so as to be substantially rotationally symmetrical, comprising a central vertical axis x.

In the base area, the vessel 6 preferably encompasses a mixer 7. In the assigned position of the vessel 6, said mixer is coupled in a positive manner in the vessel accommodation 5 to a mixer drive, which is provided in the kitchen appliance 1.

The power supply of the mixer drive as well as of a heater 8, which is more preferably provided on the base side of the container, and furthermore also the electrical control of the entire kitchen appliance 1 is attained via a power cord 9.

In particular during operation of the mixer 7 and/or of the heater 8, the vessel 6 is furthermore closed by means of a lid 10. Said lid encompasses a filling opening 11, preferably centrally, accommodating the vertical axis x of the vessel 6, this more preferably in the case of a layout of the lid 10, which, as a whole, substantially has the shape of a circular disc.

The vessel 6 encompasses a vessel wall 12, which extends from the base area upwards in vertical direction and which merges into a vessel edge 13, which projects radially outwards on the side of the vessel opening. With reference to a vertical cross section, said vessel edge is formed at least approximately in the shape of the section of a circle, more preferably in a semicircular shape, comprising a curvature surface 14, which is oriented vertically upwards.

The lid 10 is provided with a lid edge 15, which extends radially outwards. With reference to a vertical section according to FIG. 10, adapted to the vessel edge 13, said lid edge extends at least partially in the shape of a section of a circle, more preferably running partially concentrically to the vessel edge 13 in assigned position of the lid 10. In the assigned position, the lid 10 is supported via the lid edge 15 thereof on the vessel edge 13.

Albeit not illustrated, provision is made at the lid 10 or in the area of the vessel edge 13 for a seal, in particular for arranging the lid 10 on the vessel 6 in a fluid-tight manner. Typically, such a seal consists of a soft plastic material, for example of a thermoplastic elastomer.

In particular during operation of the kitchen appliance, furthermore in particular during the mixer and/or heating operation, the lid 10, which is attached to the vessel 6, must be locked, because, if applicable, high forces can be created in the vessel 6 during operation of the kitchen appliance 1, for example due to a comminution process by means of the mixer 7 and/or by means of a fluid dynamics. For this purpose, the kitchen appliance 1 encompasses a locking part 16, which locks the lid 10 against the vessel 6. This locking part 16 is preferably embodied so as to be elongated, in a wavelike manner, comprising a central axis, which is oriented in longitudinal extension and which simultaneously represents an axis of rotation y of the locking part 16. The latter further extends parallel to a plane, which is spanned by the lid edge 15 or by the vessel edge 13, respectively.

The arrangement of the axis of rotation y is furthermore chosen in such a way that it preferably extends radially outside of the vessel edge 13, further in vertical overlap to the vessel edge 13 below it. It is more preferred hereby for the axis of rotation y to intersect the center point of the vessel edge 13, which has the shape of the section of a circle, with regard to a vertical section.

As a result of the above-described arrangement and orientation of the axis of rotation y, the cylindrical locking part 16, which is elongated as a whole, is arranged in such a way that, with reference to a top view, it intersects the vessel edge 13 as well as, in the assigned position, the lid edge 15 in a secant-like manner, wherein, in the illustrated exemplary embodiment, the axial length of the locking part 16 is chosen in such a way that both end areas thereof project freely beyond the edge area, which is encompassed partially in a secant-like manner, with regard to a top view.

As can be seen in particular from the top view illustration in FIG. 2, provision is preferably made only for a locking part 16, which can be rotationally displaced. With reference to a top view, an overlap 20, which can be picked up by the user, preferably manually, is embodied diametrically opposite said locking part 16. Said overlap is preferably integrally molded in the vertically upper end area of a handle 21, which is fastened to the cooking vessel 6. The overlap 20 is preferably designed such that, in the position in which the lid 10 is put on the vessel edge 13, the overlap overlaps the lid edge 15 at least partially, wherein this overlap 20 alone does not represent a lock. Said lock is only attained as a result of corresponding rotational displacement of the diametrally opposite locking part 16. As a result of this embodiment, a three-point lock of the lid 10 can be attained.

The locking part 16, which is wavelike as a whole, is provided with a cavity 22, which, in the illustrated exemplary embodiment, preferably extends approximately across 60% to 70% of the axial length of the locking part 16. It is embodied in such a way that a circular arc-like overlap section 23 appears, in each case assigned to the end areas of the cavity 22, viewed in axial direction, with reference to a vertical section, that is, with reference to a section viewed vertically to the axis of rotation y. Said overlap section preferably extends concentrically to the axis of rotation y, wherein, with regard to its radial extension as well as with regard to its extension in circumferential direction, the cavity section, which is covered by the overlap section 23, is designed to accommodate the vessel edge 13 as well as the lid edge of the lid 10, which is attached to the cooking vessel 6, in a positive manner. The overlap section 23, which extends so as to protrude freely with reference to a vertical section, preferably extends in a circular arc-like manner, in the illustrated exemplary embodiment across an area of preferably 80°.

Viewed in direction of extension of the axis of rotation y, the locking areas in the area of the overlap sections 23, which appear as a result of the above-described embodiment, are spaced apart from one another by a dimension a, which corresponds approximately to a third of the lid diameter d in the illustrated exemplary embodiment.

Further viewed in the direction of extension of the axis of rotation y, a support area 24 is embodied centrally between the overlap sections 23. Said support area is preferably molded in a spherical head-like manner or in a ball-like manner, in particular with reference to a vertical section, comprising a support surface, which runs concentrically to the axis of rotation y and, in corresponding assigned position, thus more preferably concentrically to the course of the cooking vessel edge 13 and/or of the lid edge 15 in a vertical section.

In the support area 24, the cavity is formed in such a way that, in a lid released position, a free vertical lifting or lowering, respectively, of the cooking vessel 6, as well as of the lid 10 can be attained above the support area 24. As a result of the embodiment of the lid 10 in a circular disc-shaped manner as a whole, the lid can be assigned to the vessel edge 13 in an undirected manner.

The axis of rotation y of the locking part 16 preferably extends through the center of the support area 24, so as to hold the vessel position as constant as possible in response to a rotation of the locking part 16.

To operate the kitchen appliance 1, the lid 10 is initially inserted with a partial section of its lid edge 15 in the area of the overlap 20, whereafter the lid 10 is placed onto the cooking vessel 6 as a result of a pivot displacement towards the vessel edge 13.

As a result of rotation of the locking part 16, the overlap sections 23, which are distanced to one another in axial direction, are displaced beyond the lid edge 15, into an end position, in which the locked state of the lid 10 is reached when the overlap 20 is displaced in locked position. Preferably, an axial tensioning of vessel 6 and lid 10 is not attained hereby. Instead, it is preferably only ensured that the vessel 6 and the lid 10 cannot be separated in the locked state, even by high forces. The tightness is preferably ensured by means of the mentioned radial seal.

In preferred as well as in illustrated embodiment, the locking part 16 is supported on the side of the machine housing in the area of both axial ends thereof indirectly via interconnecting an elastically resilient acting part 17 in each case via a rotary part 18. More preferably, an axial end of the locking part 16 is hereby connected indirectly to an electric motor 19, which is arranged in the kitchen appliance 1, via the elastically resilient acting part 17, which is assigned to this end, and the rotary part 18, which is also assigned to this axial end. As illustrated, the arrangement of the electric motor 19 is preferably chosen such that the axis of rotation thereof coincides with the axis of rotation y of the locking part 16 at least in an unstressed initial position. In this regard, alternative solutions provide for an arrangement of such an electric motor, for example in the base area of the kitchen appliance, wherein, in this case, provision is made for a translation into the plane of the axis of rotation y, for example by means of a belt drive or the like.

The electric motor 19 has a shaft end 25, which can be rotationally driven via said electric motor. Said shaft end is connected in a torque proof manner to a first rotary part 18, which is embodied substantially massively of a hard plastic or metal material and which, more preferably, is supported by a housing section 26 of the kitchen appliance 1, preferably across the entire circumference.

The broadside of the rotary part 18 located opposite the shaft end 25 is provided with an axial depression 27. The elastically resilient acting part 17 is accommodated and held in said axial depression, with said elastically resilient acting part 17 preferably being a helical spring 28, more preferably made of a spring steel comprising a leaf spring-like cross section.

A radially inner end section of the acting part 17 is connected to the rotary part 18 in a torque proof manner by permeating a wall section of the assigned rotary part 18 surrounding the acting part 17. In an initial position, the radially outer end section 29 engages with the lid edge 16 on the top side.

The end of the locking part 16 located opposite the end on the drive side is preferably held or supported, respectively, in the same manner. Provision is also made in this area for a spring-like acting part 17 as well as for a rotary part 18, which is connected to the other rotary part 18 in a torque proof manner.

More preferably, the locking part 16 embodies a hinged section 30, which acts on the lid 10. In particular in connection with the electric motor 19, which acts on this hinged section 30, it serves as opening or set-up aid, respectively, for the lid 10 by an electric motor.

Provision is preferably made in the control panel 2 for a button 31 or for a further switch, which, serving an lid opening button, controls the electric motor 19 such that a lifting of the lid 10 to release the container interior results through this. This is advantageous, for example, if the adding of larger quantities of ingredients is intended during the cooking process and/or mixing process in the cooking vessel 6.

By operating the button 31, the shaft end 25 is initially rotationally displaced further towards lid closed position or lid locked position, respectively, via the electric motor 19

(this more preferably by simultaneously turning off the mixer drive and/or heater). The two rotary parts 18 of the pivot or locking part 30, 16, respectively, are connected to one another in a torque proof manner, whereby the rotation of the electric motor 19 is transferred to the springs 28. Due to the fact that the locking part 16 or hinged section 30, respectively, experiences a stop in particular in the upper side of the lid 10 or of the lid edge 19, respectively, which interacts with the overlap sections 23, the locking part 16 or hinged section 30, respectively, cannot carry out a further rotation. The free end sections 29 of the springs 28, in contrast, are rotationally displaced further relative to the locking part 16 or hinged section 30, respectively, by pressing these end sections 29 against the surface of the lid edge 15. Due to the increase of the spring force, which builds, the end sections 29 also carry out a lateral escape movement until the lid edge 15 has been overcome. With reference to a top view according to the illustration in FIG. 2, the end sections 29 of the springs 28 hereby carry out a sliding escape movement in opposite directions. By running over the lid edge 15, the end sections 29 of the springs 28 jump, for capturing the lid edge 15 from below as a result of the spring force released after the overrunning of the lid edge 15. In this position, the end sections 29 of the springs 28 form an additional bearing point, wherein, in addition to the contact points in the area of the overlap sections 23 and the support area 24, at least two further contact points are now provided for acting on the lid edge 15. In particular the overlap sections 23, together with the end sections 29, which act against the opposite surface of the lid edge 19, act on the lid edge 15 in a clamping manner.

The rotation of the shaft end 25 further towards the locked position takes place for a short period of time, at least until the spring end sections 29 have slid across the lid edge 15 and have attached to the underside. In one embodiment, the corresponding control of the electric motor 19 occurs in a temporally limited manner. In the alternative, the rotation of the shaft end 25 takes place via a predetermined rotation angle, which ensures the sliding of the spring end sections 29.

A reversal of the direction of rotation of the electric motor 19, in response to which the lid 10 is clamped in the area of its traversing lid edge 15 between the overlap sections 23 and the spring end sections 29 so as to be pivoted open about the axis of rotation y of the pivot part 30, after this rotation of the shaft end 25 further in the locked direction. For this purpose, the user must initially lift the overlap 20, preferably manually, for the corresponding first unlocking of the lid 10.

Via the hinged section 30, the lid 10 can preferably be displaced into a position, in which a lid plane, preferably a sealing plane of the lid 10, extends in a vertically oriented plane or draws an acute angle of between 1 and 15 degrees to this plane.

In this position, the cooking vessel interior is exposed for correspondingly accessing the content. It is also possible in this lid open position to remove the cooking vessel 6 from the vessel accommodation 5, for example for emptying it.

By operating the button 31 again, in the alternative by operating a further button, the lid 10 can be pivoted back into the cooking vessel locked position, after which the kitchen appliance 1, in particular the mixer 7 in the cooking vessel 6 and/or the heater 8 can be put into operation, by reestablishing the lock in the area of the overlap 20.

The lid open position illustrated in an exemplary manner in FIG. 15 is preferably stop-limited, more preferably because the locking part 16 or the hinged section 30, respectively, stops at a housing section of the kitchen appliance 1. In the event that the lid 10 is to be removed for cleaning thereof, for example, the electric motor 19 rotates the shaft end 25 beyond the stop position of the locking part 16 or hinged section 30, respectively, for a corresponding relative displacement in particular of the end sections 29 of the springs 28 relative to the lid edge 15. The spring end sections 29 slide accordingly beyond the base side of the lid edge 15, so as to run over the lid edge 15 again and so as to attach to the lid edge upper side again thereafter according to the initial position.

In a further preferred embodiment, the lid unlocking takes place in the lid attached position on the cooking vessel 6 or on the cooking vessel edge 13, respectively, this more preferably in the locked position of the overlap 20. By corresponding rotational displacement via the electric motor 19, the respective end section 29 of the springs 28 is initially also acted upon such that said end section slides across the lid edge 15 and jumps to the lid edge upper side. By further rotating the shaft end 25 towards a lid open position, the locking part 16 or the hinged section 30, respectively, is now also displaced into the lid unlocked position according to FIG. 6, whereafter the lid 10 can be removed from the cooking vessel 6 after lifting the overlap 20.

As a result of the proposed solution, the lid 10, which might have heated up during the cooking process, does not need to be touched directly by the user. Instead, both the locking and unlocking as well as placement or depositing, respectively, of the lid on the vessel edge 13 are controlled via electric motor via the kitchen appliance 1. Possible food remnants or liquids adhering to the lid 10 drip back into the cooking vessel 6 in the open state of the lid 10.

The bearing zones formed due to the attachment of the spring end sections 29 to the lid edge on the base side simultaneously form an overload protection, in particular in the lid open position, so that, in the upright position, the lid 10 is protected by overlapping against breaking caused by external influences.

All of the disclosed features (alone) are significant for the invention. The disclosure content of the corresponding/enclosed priority documents (copy of the earlier application) is hereby also included in its entirety into the disclosure of the application, also for the purpose of adding features from these documents into claims of the instant application. In their optionally independent version, the subclaims characterize independent inventive further developments of the state of the art, in particular for filing divisional applications on the basis of these claims.

| List of Reference Numerals: | |
|---|---|
| 1 | kitchen appliance |
| 2 | control panel |
| 3 | controller/button |
| 4 | display |
| 5 | vessel accommodation |
| 6 | cooking vessel |
| 7 | mixer |
| 8 | heater |
| 9 | power cord |
| 10 | lid |
| 11 | filling opening |
| 12 | vessel wall |
| 13 | vessel edge |
| 14 | curvature surface |
| 15 | lid edge |
| 16 | locking part |
| 17 | acting part |
| 18 | rotary part |
| 19 | electric motor |

-continued

List of Reference Numerals:

| | |
|---|---|
| 20 | overlap |
| 21 | handle |
| 22 | cavity |
| 23 | overlap section |
| 24 | support area |
| 25 | shaft end |
| 26 | housing section |
| 27 | depression |
| 28 | spring |
| 29 | end section |
| 30 | hinged section |
| 31 | button |
| a | distance dimension |
| d | lid diameter |
| x | vertical axis |
| y | axis of rotation |

The invention claimed is:

1. An electrically operated kitchen appliance, comprising:
a cooking vessel further comprising a cooking vessel base and a cooking vessel wall;
a lid for the cooking vessel, the lid comprising a lid edge, a lid upper surface, and a filling opening;
a lock formed by a locking part acting on the lid, the locking part comprising a hinged part having a pivot axis, the hinged part being configured to pivot around the pivot axis;
an electric motor;
an electrical control panel powered by a power supply; and
a heater configured to heat the cooking vessel;
wherein the lid can be locked via the lock in a closed position against the cooking vessel,
wherein the cooking vessel wall extends upwards from the cooking vessel base,
wherein the cooking vessel wall transitions into a radially projecting cooking vessel edge,
wherein the lid edge covers the cooking vessel edge in the closed position,
wherein the hinged part interacts with the lid edge and is operable by the electric motor,
wherein the hinge part is configured to pivot the lid from a closed position into an open position by the electric motor,
wherein the lid is removable from the hinged part by the user non-destructively and without a tool,
wherein the lid edge engages with the hinged part at an engagement part of the hinged part and the lid edge runs above the engagement part, and
wherein a majority of an area of the upper surface of the lid is not covered by the hinged part.

2. The kitchen appliance according to claim 1, wherein the hinged part acts on the lid edge via a positive locking or frictional connection for holding the lid, and
wherein the hinged part can remain at the kitchen appliance after removing the lid.

3. The kitchen appliance according to claim 1, wherein the hinged part encompasses a pivot axis is embodied so as to be elongated in the direction of extension of the pivot axis.

4. The kitchen appliance according to claim 1, wherein a geometric axis of the hinged part is arranged outside of the vessel wall.

5. The kitchen appliance according to claim 1, wherein the hinged part is rotatably drivable from the released position into the locked position and vice versa from one or both end areas.

6. The kitchen appliance according to claim 1, wherein the locking part further comprises at least two overlap sections positioned in the locked state of the lid in circumferential direction of the lid edge at a distance from one another.

7. The kitchen appliance according to claim 1, wherein outermost locking areas of the hinged part are spaced apart from one another by $\frac{1}{10}$ to $\frac{1}{2}$ of the lid diameter.

8. The kitchen appliance according to claim 1, wherein the hinged part encompasses one or a plurality of contact areas for the vessel edge.

9. The kitchen appliance according to claim 1, wherein a pivot effect on the lid occurs via an acting part provided in the hinged part.

10. The kitchen appliance according to claim 9, wherein the acting part is embodied so as to be resilient and can be moved between an acting position, which reaches under the lid, and a lid release position by operation of the electric motor.

11. The kitchen appliance according to claim 2, wherein the hinged part acts on the lid edge via a frictional connection for holding the lid, and
wherein the frictional connection is attained via a detent or a magnetic adhesion.

12. The kitchen appliance according to claim 1, wherein a geometric axis of the hinged part permeates the vessel wall.

13. The kitchen appliance according to claim 1, wherein the hinged part covers the lid edge with a circular arc-like cross section across an area of between 30° and 90°.

14. The kitchen appliance according to claim 8, wherein the contact area is embodied in a spherical head-shaped manner.

15. The kitchen appliance according to claim 14, wherein the contact area is embodied centrally between outermost locking areas relative to a longitudinal extension of the hinged part.

16. The kitchen appliance according to claim 1, wherein the hinged part comprises two contact areas for the cooking vessel edge, the two contact areas being offset from each other across a circumference of the cooking vessel edge.

17. The kitchen appliance according to claim 9, wherein the acting part acts on the lid edge.

18. The kitchen appliance according to claim 9, wherein the acting part is resilient in a pivot direction of the hinged part.

19. The kitchen appliance according to claim 9, wherein the acting part is a spring.

20. The kitchen appliance according to claim 9, wherein the acting part is a coil spring.

* * * * *